United States Patent [19]

Maxson

[11] Patent Number: 5,004,792

[45] Date of Patent: Apr. 2, 1991

[54] METHOD FOR EXTENDING THE WORKING LIFE OF ORGANOSILOXANE COMPOSITIONS CURABLE BY A PLATINUM CATALYZED HYDROSILATION REACTION

[75] Inventor: Myron T. Maxson, Midland, Mich.

[73] Assignee: Dow Corning Corporation, Midland, Mich.

[21] Appl. No.: 211,613

[22] Filed: Jun. 27, 1988

Related U.S. Application Data

[63] Continuation-in-part of Ser. No. 103,991, Oct. 1, 1987, abandoned, which is a continuation-in-part of Ser. No. 899,111, Aug. 22, 1986, abandoned.

[51] Int. Cl.$^5$ ............................................. C08G 77/06
[52] U.S. Cl. ...................................... 528/15; 528/31; 528/32; 525/478
[58] Field of Search ............................ 528/15, 31, 32; 525/478

[56] References Cited

U.S. PATENT DOCUMENTS

| | | |
|---|---|---|
| 3,188,299 | 6/1965 | Chalk . |
| 3,445,420 | 5/1969 | Kookootsedes et al. . |
| 3,699,073 | 10/1972 | Wada et al. . |
| 3,923,705 | 12/1975 | Smith . |
| 3,989,667 | 11/1976 | Lee et al. . |
| 4,256,870 | 3/1981 | Eckberg . |
| 4,472,563 | 9/1984 | Chandra et al. . |

Primary Examiner—John C. Bleutge
Assistant Examiner—R. Dean, Jr.
Attorney, Agent, or Firm—Robert Spector

[57] ABSTRACT

Certain liquid polydiorganosiloxanes wherein each molecule contains at least one sequence of 2 or more vinyl radicals bonded to non-terminal silicon atoms extend the working time at 25° C. of organosiloxane compositions that cure by a platinum catalyzed hydrosilation reaction without adversely affecting the cure rate of the composition at temperatures of about 100° C. and above. These polydiorganosiloxanes can constitute up to 100 percent of the vinyl-containing polydiorganosiloxanes present in said organosiloxane compositions and are prepared by polymerizing the corresponding cyclosiloxanes in the presence of an acid catalyst.

6 Claims, No Drawings

METHOD FOR EXTENDING THE WORKING LIFE OF ORGANOSILOXANE COMPOSITIONS CURABLE BY A PLATINUM CATALYZED HYDROSILATION REACTION

REFERENCE TO COPENDING APPLICATIONS

This application is a continuation-in-part of copending application Ser. No. 103,991, file on Oct. 1, 1987, now abandoned which in turn is a continuation-in-part of application Ser. No. 899,111, filed on Aug. 22, 1986, now abandoned.

BACKGROUND OF THE INVENTION

1. Field of the Invention

This invention relates to organosiloxane compositions. More particularly, this invention relates to a method for extending the working life at room temperature of organosiloxane compositions curable by a platinum-catalyzed hydrosilation reaction without adversely affecting the cure rate of these compositions at temperatures of about 100° C. and above.

2. Description of the Prior Art

One mechanism for curing organosiloxane compositions is by a hydrosilation reaction between a polyorganosiloxane containing two vinyl or other ethylenically unsaturated hydrocarbon radicals per molecule and an organohydrogensiloxane containing an average of at least three silicon bonded hydrogen atoms per molecule. Alternatively each molecule of the polyorganosiloxane contains three or more vinyl radicals and the organohydrogensiloxane contains two silicon bonded hydrogen atoms per molecule. The reaction is conducted in the presence of a platinum compound that is at least partially soluble in the reaction mixture and catalyzes the hydrosilation reaction.

In some instances the curing reaction will begin at temperatures of about 25° C. once all of the reactants and catalyst have been combined. For some applications it is desirable to delay curing of the composition at these temperatures in order to store the composition for several hours prior to curing to obtain additional working time and/or ensure that the composition will completely fill all parts of a mold before curing to the extent that the composition is no longer flowable.

Many different classes of compounds will inhibit platinum catalyzed hydrosilation reactions. One type of inhibitor is volatile and must be removed from the composition by evaporation for the hydrosilation reaction to proceed. Non-volatile inhibitors are inactivated by heating.

Volatile inhibitors include the vinyl-containing cyclic organosiloxanes disclosed in U.S. Pat. No. 3,923,705, which issued to Smith on Dec. 2, 1975, the acetylenic alcohols such as 2-methyl-3-butyn-3-ol described in U.S. Pat. No. 3,445,420 that issued to Kookootsedes et. al on May 20, 1969, and some of the heterocyclic amines such as pyridine disclosed in U.S. Pat. No. 3,188,299 that issued on Jun. 8, 1965.

Non-volatile inhibitors are exemplified by the alkyl maleates disclosed in U.S. Pat. No. 4,256,870, which issued to Ekberg on Mar. 17, 1981, and the olefinic siloxanes described in U.S. Pat. No. 3,989,667, which issued to Lee and Marko on Nov. 2, 1976.

The olefinic siloxanes described in the aforementioned Lee and Marko patent are reaction products of secondary or tertiary acetylenic alcohols with siloxanes having silicon-bonded hydrogen atoms. The reaction products contain from 3 to 10 siloxane units with a total of at least three units of the formula RHSiO or $R_2HSiO_{0.5}$ and at least one unit of the formula

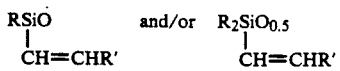

where R represents a monovalent radical selected from the group consisting of hydrocarbon radicals and perfluoroalkylethylene radicals and R' represents a monovalent hydrocarbon radical substituted with a secondary or tertiary hydroxyl group.

Because the reaction products inhibit the hydrosilation reaction used to prepare them, the mixture of acetylenic alcohol, siloxane and platinum catalyst must be heated at temperatures above 100° C. to inactivate the inhibitor. In accordance with the teaching of Lee and Marko, the mixture of reactants is passed through a tube wherein the mixture is heated above 100° C. under sufficient pressure to maintain the reactants in the liquid state. The reaction product is typically a mixture wherein one or more of the silicon bonded hydrogen atoms on each molecule of the initial organohydrogensiloxane have been reacted.

The inhibitors of Lee and Marko are less than desirable because of the high temperatures and pressures required to prepare them and the difficulty of obtaining a pure material that will function reproducibly as an inhibitor.

U.S. Pat. No. 3,699,073 which issued to Wada et al. on Oct. 17, 1972, hereinafter referred to as the Wada patent, discloses room temperature curable organopolysiloxane compositions comprising a diorganopolysiloxane containing a silicon-bonded vinyl radical at the two terminal positions of each molecule (identified in the patent as "component 1"), an organohydrogenpolysiloxane, an inorganic filler, a platinum-containing catalyst to promote curing of the composition and an optional copolymer consisting of $SiO_2$, triorganosiloxy and diorganovinylsiloxy units, where the silicon bonded organic groups are monovalent hydrocarbon radicals that are free of ethylenic unsaturation. The inventive ingredient of these compositions is an organosiloxane copolymer, referred to in the patent as "component 3", wherein the main chain is composed of RR'SiO units (a) or a mixture of these units and $R'SiO_{3/2}$ units (b) and the copolymer is terminated with $R''R_2SiO_{\frac{1}{2}}$, $R''OSi(R'_2)O_{0.5}$ or $HOSi(R'_2)O$ units. The molar ratio of b units to the total of a and b units does not exceed 0.5. In these formulae R represents a monovalent hydrocarbon radical that is free of ethylenic unsaturation, at least one percent of the radicals represented by R' are vinyl with the remainder selected from the group as R, and R" represents a saturated or ethylenically unsaturated hydrocarbon radical.

Example 1 of the Wada patent demonstrates that the presence of 3 parts by weight of an organosiloxane copolymer of the type referred to hereinabove as component 3 per 100 parts of vinyl-terminated diorganopolysiloxane enabled the composition to remain pourable for about 6 hours. The composition cured in 24 hours under ambient conditions.

For some end-use applications it is desirable to achieve room temperature storage and/or working times longer than 6 hours for organosiloxane compositions of the type described in the aforementioned Wada et al. patent using the same amount of inhibitor.

The Wada patent does not teach a method for preparing the copolymer referred to as component 3. The only discussion of preparative methods appears in connection with the vinyl-terminated diorganopolysiloxane identified as "component 1". These methods, described in column 3 beginning at line 11, include "cohydrolyzing corresponding chlorosilanes or alkoxysilanes, or by subjecting divinyltetraorganodisiloxane and diorganosiloxane to an equilibrium reaction. The term "diorganosiloxane" can refer either to linear or cyclic diorganosiloxanes. No mention is made of the type of catalyst used for this reaction, leading to the assumption that the choice of catalyst is not critical. The catalysts typically used for this type of reaction are acids such as the alkylsulfonic acids and bases such as alkali metal salts, hydroxides and silanolates.

SUMMARY OF THE INVENTION

Applicant has now discovered that the type of catalyst used to prepare certain liquid vinyl-containing polydiorganosiloxanes described in detail hereinafter has a profound effect on the increase to which these polydiorganosiloxanes will increase the working time at 25° C. of organosiloxane compositions that cure by a platinum catalyzed hydrosilation reaction. Polymerizing a mixture of a vinyl-containing cyclosiloxane such as 2,4,6,8-tetramethyl-2,4,6,8-tetravinylcyclotetrasiloxane and a non-vinyl-containing cyclosiloxane in the presence of a strong acid catalyst such as an alkylsulfonic acid yields a polydiorganosiloxane wherein each molecule contains at least one sequence of 2 non-terminal silicon atoms containing a vinyl radical as a substituent. Applicant has demonstrated the absence of this type of structure in polydiorganosiloxanes prepared using conventional basic catalysts.

Unlike many prior art inhibitors, Applicant's polydiorganosiloxanes do not adversely affect the cure rate of the composition at temperature of about 100° C. and above.

DETAILED DESCRIPTION OF THE INVENTION

This invention provides an improved method for extending the working time at 25° C. of a heat curable organosiloxane composition comprising A. at least one triorganosiloxy terminated polydiorganosiloxane containing at least two vinyl radicals per molecule, B. an amount sufficient to cure said composition of a organohydrogensiloxane containing at least two silicon-bonded hydrogen atoms per molecule, C. a platinum hydrosilation catalyst in an amount sufficient to promote curing of said composition, and D. an amount of inhibitor for said catalyst sufficient to extend the working time of said composition at 25° C., where said inhibitor is a vinyl-containing polydiorganosiloxane that constitutes at least a portion of said triorganosiloxy-terminated polydiorganosiloxane.

The improvement comprises selecting as the inhibitor portion of said triorganosiloxy terminated polydiorganosiloxane at least one polydiorganosiloxane containing in each molecule at least one sequence of at least two organovinylsiloxane units and represented by the average formula $$R^3R^4MeSi(OSiMeR^2)_x[(OSiR^1Vi)_y]_zOSiR^3R^4Me \quad (I)$$

where Me represents methyl, Vi represents vinyl, $R^1$, $R^2$ and $R^3$ individually represent methyl, phenyl or $-CH_2CH_2Rf$, $R^4$ is selected from the group consisting of $R^1$ and vinyl radicals, Rf represents a perfluoroalkyl radical containing from 1 to 8 carbon atoms, the value of x is at least 4, the value of y is from 2 to 5, and the value of z is at least 1. The inhibitor is prepared by polymerizing in the presence of an acid catalyst a first cyclic diorganosiloxane containing repeating units of the formula $ViR^1SiO$, a second cyclic diorganosiloxane containing repeating units of the formula $MeR^2SiO$ and an organosilicon compound of the formula $R^3R^4MeSiX$ or one containing at least one group of the formula $R^3R^4MeSiO_{\frac{1}{2}}$, where X represents a hydrolyzable atom or group.

The novel feature of the present method resides in using at least one of the aforementioned catalyst-inhibiting polydiorganosiloxanes as at least a portion of the polydiorganosiloxane referred to hereinbefore as ingredient A.

The present inventor discovered that the polydiorganosiloxanes represented by formula I are unique by virtue of their ability to inhibit the activity of platinum-containing hydrosilation catalysts for relatively long periods of time at room temperature, i.e. about 25 degrees C., without adversely affecting the ability of the catalyst to promote rapid curing at temperatures of 100 degrees C. and above.

The curable compositions into which polydiorganosiloxanes corresponding to formula I are incorporated typically contain a polydiorganosiloxane with an average of at least two vinyl or other ethylenically unsaturated hydrocarbon radicals per molecule, referred to hereinafter as ingredient A, an organohydrogensiloxane containing at least two silicon bonded hydrogen atoms per molecule, referred to hereinafter as ingredient B, in an amount sufficient to cure the composition to a product exhibiting the desired physical property profile, and a platinum-containing hydrosilation catalyst in an amount sufficient to promote curing of the composition at a temperature of about 100° C. and above, referred to hereinafter as ingredient C.

Ingredient A typically contains two vinyl radicals and ingredient B contains at least three silicon bonded hydrogen atoms per molecule. Alternatively, ingredient A can contain three or more vinyl or other ethylenically unsaturated radicals per molecule, in which instance ingredient B contains an average of two silicon bonded hydrogen atoms per molecule.

In one embodiment of the present method the catalyst-inhibiting polydiorganosiloxane of the present invention, represented by the foregoing formula I, constitutes only a portion of ingredient A.

In a second embodiment of the present method the polydiorganosiloxane represented by formula I constitutes all of ingredient A. This is contrary to the aforementioned Wada patent, which teaches that the physical properties of the cured product are adversely affected when the inhibiting organosiloxane copolymer is the only vinyl-containing polyorganosiloxane present in the composition.

In accordance with the present method polydiorganosiloxanes corresponding to formula I are prepared by reacting a vinyl-containing cyclosiloxane of the formula $(R^1ViSiO)_y$ with a cyclosiloxane of the formula $(MeR^2SiO)_m$ and an organosilicon compound of the formula $R^3R^4MeSiX$ or one containing at least one group of the formula $R^3R^4MeSiO_{\frac{1}{2}}$. The $R^3R^4MeSi$— units provide the terminal units of the final inhibitor. The concentration of $R^3R^4MeSi$— units in the reaction mixture will be determined by the desired molecular weight of the inhibitor. In these formulae $R^1$, $R^2$, $R^3$, $R^4$, Me, Vi, x and y are as previously defined, m represents an integer of from 3 to 5, inclusive and n represents 0 or an integer from 1 to about 10, inclusive. Hydrolyzable groups represented by X include but are not limited to halogen atoms, nitrogen, and alkoxy groups.

The reaction is conducted in the presence of a catalyst that will promote hydrolysis and polymerization of the cyclosiloxanes without cleaving a substantial number of the resultant linear molecules, and causing a rearrangement in the sequence of siloxane groups. Suitable catalysts include strong acids such as sulfuric acids and the alkylsulfonic acids. Trifluoromethanesulfonic acid is particularly preferred because of its availability, catalytic activity and the low amount of siloxane bond rearrangement obtained using this catalyst.

Basic catalysts such as the alkali metal hydroxides and silanolates are known to cleave and rearrange siloxane (SiO) bonds and therefore should not be used to prepare the catalyst-inhibiting polydiorganosiloxanes of this invention.

The mixture of reactants and catalyst is heated until the desired molecular weight has been achieved, as determined by the concentration of the aforementioned $R^3R^4MeSi$— groups in the reaction mixture. Further reaction serves no useful purpose, and may even be detrimental by causing rearrangement of the siloxane units.

Techniques for determining the molecular weight of a polyorganosiloxane include viscosity measurement, gel permeation chromatography and osmometry. These techniques are well known, and do not form part of this invention.

Up to about 200 parts per million of water, based on the weight of cyclosiloxane, can be included in the initial reaction mixture to facilitate hydrolysis and ring-opening of the cyclosiloxane reactants.

Following completion of the reaction between the cyclic and linear organosiloxanes the acid catalyst is neutralized using a basic material, such as sodium bicarbonate, that will not cause rearrangement of the reaction product.

The liquid phase of the reaction mixture is then separated from the solid neutralization by-product by filtration and concentrated under reduced pressure with heating to remove volatile materials. The residual material, which consists essentially of an inhibitor of this invention, is a liquid polyorganosiloxane exhibiting a viscosity of from about $1 \times 10^{-4}$ to about $1 \times 10^{-2}$ meters$^2$/sec. at 25° C., and can be used as a catalyst-inhibiting polydiorganosiloxane without further purification.

For the catalyst-inhibiting polydiorganosiloxane to be effective it must be compatible with the other ingredients of the curable composition, particularly if this polydiorganosiloxane does not constitute all of ingredient A. Typically at least a portion of the silicon bonded hydrocarbon radicals of the catalyst-inhibiting polydiorganosiloxane should be identical with the hydrocarbon radicals present in the remaining components of ingredient A.

One of the criteria used in selecting the hydrocarbon radicals represented by $R^1$, $R^2$ $R^3$ and $R^4$ in formula I is the silicon bonded hydrocarbon radicals present in the other organosiloxane ingredients of the curable composition into which the present catalyst inhibitors will be incorporated.

In a preferred embodiment of the present method the radical represented by $R^1$, $R^2$ and $R^3$ are individually selected from methyl, phenyl or 3,3,3-trifluoropropyl, $R^3$ is methyl and $R^4$ is methyl or vinyl, x is from 10 to about 100, y is 3 or 4 and z is from 5 to about 20, inclusive.

If it is desired to prepare an optically clear product such as a gel, the refractive indices of all ingredients of the curable composition should be substantially identical. One of the factors affecting the refractive indices of these ingredients is the type(s) of silicon bonded hydrocarbon radicals present. It is therefore preferable that at least about 50 mole percent of the hydrocarbon radicals present on the inhibitor should match those of the other liquid ingredients of the curable composition.

Storage-stable, curable compositions of this invention are prepared by blending to homogeniety the vinyl-containing polydiorganosiloxane(s), the organohydrogen siloxane and the platinum-containing catalyst. Reinforcing and/or non-reinforcing filler can also be included in the composition. As discussed hereinabove, the novel catalyst inhibitor of this invention constitutes at least a portion of the polydiorganosiloxane reactant(s), referred to hereinbefore as ingredient A.

The composition is cured by heating it at temperatures of from about 30° to about 200° C. for a period of from 1 to about 8 hours.

One embodiment of a curable composition comprises as ingredient A at least one polyorganosiloxane containing an average of two vinyl or other ethylenically unsaturated hydrocarbon radicals per molecule an addition to one of the catalyst-inhibiting polydiorganosiloxanes corresponding to formula I. In this embodiment, the non-inhibiting polydiorganosiloxane preferably contains a vinyl radical bonded to each of the two terminal silicon atoms. The repeating units of this ingredient can be represented by the formula $R^5R^6SiO$, where $R^5$ and $R^6$ are each monovalent hydrocarbon radicals or perfluoroalkylethyl radicals wherein the perfluoroalkyl portion contains from 1 to about 8 carbon atoms. Preferably $R^5$ is methyl or phenyl and $R^6$ is methyl, phenyl or 3,3,3-trifluoropropyl, these preferences being based on the availability and cost of the reactants used to prepare the polydiorganosiloxane and the properties of materials obtained by curing these polymers.

If it is desired to prepare a cured material that will not be softened or dissolved by liquid hydrocarbons, at least 50 mole percent of the repeating units in the polydiorganosiloxane should contain a perfluoroalkylethyl radical such as 3,3,3-trifluoropropyl.

It will be understood that Ingredient A can contain a small concentration, typically less than about 1 mole percent, of branching resulting from the presence of trifunctional units corresponding to the formula $R^5SiO_{3/2}$ or $R^6SiO_{3/2}$ in the polymer molecule. These units are typically the result of impurities present in the reactants used to prepare the polydiorganosiloxane.

The embodiment of ingredient A containing two vinyl radicals per molecule is cured by reacting it with a relatively low molecular weight, liquid organohydrogensiloxane (ingredient B) containing an average of at least three silicon bonded hydrogen atoms per molecule. Ingredient B, also referred to hereinafter as the curing agent can contain from as few as four silicon atoms per molecule up to an average of 20 or more, and exhibits a viscosity of up to 10 Pa.s or higher at 25° C. The curing agent typically contains repeating units of the formulae $HSiO_{1.5}$, $R^7HSiO$, and/or $R^7_2 HSiO_{0.5}$. The curing agent may also include one or more monoorganosiloxane, diorganosiloxane, triorganosiloxy and $SiO_2$ units, none of which contain silicon bonded hydrogen atoms. In these formulae $R^7$ is a monovalent hydrocarbon radical as defined hereinabove for the $R^5$ radical of the polydiorganosiloxane. Alternatively, the crosslinker can be a cyclic compound containing diorganosiloxane and organohydrogensiloxane units or a compound of the formula $Si(OSiR^7_2 H)_4$.

Preferably $R^7$ is methyl or 3,3,3-trifluoropropyl, and the curing agent is a linear triorganosiloxy terminated polyorganohydrogensiloxane or a diorganosiloxane/organohydrogensiloxane copolymer containing an average of from 10 to about 50 repeating units per molecule of which from 3 to 5 are organohydrogensiloxane units.

In a second embodiment of a curable composition the polydiorganosiloxane corresponding to ingredient A contains at least three vinyl radicals per molecule and ingredient B contains two silicon bonded hydrogen atoms that are preferably located at terminal positions on the molecule and ingredient B is preferably a diorganohydrogensiloxy terminated polydiorganosiloxane. At least a portion of ingredient A is a polydiorganosiloxane represented by formula I.

If at least one of the present catalyst-inhibiting polydiorganosiloxanes constitutes more than about 50 mole percent of ingredient A and the cured product is intended to be a gel or elastomer, a corresponding portion of the curing agent (ingredient B) should preferably be an organohydrogensiloxane containing an average of two silicon bonded hydrogen atoms per molecule. A preferred curable composition of this type is one wherein a polydiorganosiloxane corresponding to formula I constitutes the entire portion of ingredient A and ingredient B is a diorganohydrogensiloxy terminated polydiorganosiloxane. Most preferably the repeating units in both of these ingredients are methyl-3,3,3-trifluoropropylsiloxane units.

The molecular weights of the polydiorganosiloxane and curing agent together with the relative concentrations of these ingredients and the number and distribution of the silicon-bonded hydrogen atoms and ethylenically unsaturated hydrocarbon radicals will determine the concentration and location of crosslinks in the cured material. The concentration of crosslinks per unit area is often referred to as the "crosslink density" and determines certain physical properties of the cured material, particularly hardness, compressibility and resiliency. The particular combinations of polydiorganosiloxane(s) and curing agent(s) yielding the desired combination of physical properties can readily be determined by routine experimentation.

The molar ratio of silicon bonded hydrogen atoms to vinyl or other ethylenically unsaturated hydrocarbon radicals present in the curable compositions is a major factor in determining the properties of the cured material, such as tensile strength, hardness and modulus.

Because of the difficulty often experienced in achieving a complete reaction between all of the silicon bonded hydrogen atoms and all of the vinyl or other ethylenically unsaturated hydrocarbon radicals present in the reaction mixture, it is often desirable to have a stoichiometric excess of one of these species in a curable composition. The preferred ratio for a given composition will be determined at least in part by the average molecular weight of the vinyl containing polyorganosiloxanes, the curing agent and the physical properties of the cured product.

Polydiorganosiloxanes corresponding to formula I are used as inhibitors in combination with hydrosilation catalysts that are either a platinum group metal or a compound of such a metal. Platinum compounds such as hexachloroplatinic acid, and particularly complexes of these compounds with relatively low molecular weight vinyl-containing organosiloxanes, are preferred catalysts because of their high activity and compatibility with the organosiloxane reactants. These complexes are described in U.S. Pat. No. 3,419,593 that issued to David N. Willing on Dec. 31, 1968. Complexes wherein the silicon bonded hydrocarbon radicals are vinyl and either methyl or 3,3,3-trifluoropropyl are particularly preferred because of their ability to catalyze a rapid curing of the elastomer at temperatures of 70° C. and above.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

In accordance with the present method the catalyst-inhibiting polydiorganosiloxanes represented by formula I constitute up to 100 percent of the ethylenically unsaturated polyorganosiloxane reactant (ingredient A) in a composition that is curable by a platinum catalyzed hydrosilation reaction using the organohydrogensiloxanes and platinum-containing hydrosilation catalysts described hereinbefore. The resultant composition is self-inhibiting and can be stored for several hours, or in some cases days, at temperatures of about 25° C. without exhibiting any substantial increase in viscosity, yet cures in one hour or less at temperatures of at least about 100° C.

An advantage of the present catalyst-inhibiting polyorganosiloxanes relative to prior art organosiloxane inhibitors is the ease with which these polydiorganosiloxanes can be made compatible with various non-inhibiting polydiorganosiloxanes by varying the hydrocarbon radicals on the polycyclosiloxanes use as starting materials to prepare the catalyst-inhibiting polydiorganosiloxanes. As discussed hereinabove, the ability to match the refractive indices of all organosiloxane ingredients is particularly advantageous when preparing optically clear cured organosiloxane compositions such as gels.

An additional advantage of using polydiorganosiloxanes represented by formula I is that they are non-volatile at the temperatures conventionally used to prepare and cure organosiloxane compositions.

The following examples demonstrate the preparation and use of preferred catalyst-inhibiting polydiorganosiloxanes. The examples should not be interpreted as limiting the scope of the invention as defined in the accompanying claims. All parts and percentages in the examples are by weight unless otherwise stated.

EXAMPLE 1

A glass reactor equipped with a mechanically operated stirrer, reflux condenser and heating means was charged with the following reactants.

1872 parts of 2,4,6-trimethyl-2,4,6-tris(3,3,3-trifluoropropyl)cyclotrisiloxane;

344 parts of 2,4,6,8-tetramethyl-2,4,6,8-tetravinylcyclotetrasiloxane; and 310 parts of a trimethylsiloxy terminated polydimethylsiloxane containing an average of 20 dimethylsiloxane units per molecule.

The resultant mixture was stirred at room temperature for a few moments to make it homogeneous, at which time 0.5 part of trifluoromethanesulfonic acid was added. The reaction mixture was then heated at a temperature of 55° C. for three hours, at which time the reaction mixture exhibited a viscosity of $0.064 \times 10^{-3}$ m²/sec. The reaction mixture was then cooled to room temperature and neutralized by the addition of 92.0 parts of sodium bicarbonate. After stirring for 24 hours at room temperature the liquid phase of the reaction mixture was isolated by filtration and concentrated by heating it for one hour at a temperature of 200° C. under a pressure of 40 milipascals. The concentrated liquid, which consisted essentially of a catalyst-inhibiting polydiorganosiloxane of this invention (I), was obtained in 82% yield, exhibited a viscosity of $1.46 \times 10^{-4}$ m²/sec., and contained 2.51 weight percent vinyl radicals.

A curable polyorganosiloxane composition was prepared by blending the following ingredients to homogeniety:

25 parts of a dimethylvinylsiloxy terminated poly(methyl-3,3,3-trifluoropropyl)siloxane containing an average of 20 methyl-3,3,3-trifluoropropylsiloxane units per molecule (ingredient A);

0.039 part of a platinum-containing hydrosilation catalyst prepared by reacting 30 parts of hexachloroplatinic acid with 16.5 parts of a dimethylvinylsiloxy terminated poly(methyl-3,3,3-trifluoropropyl)siloxane containing an average of 30 methyl-3,3,3-trifluoropropylsiloxane units per molecule (ingredient C);

0.55 part of an organohydrogensiloxane containing two dimethylhydrogensiloxy units separated by 1, 2 or 3 units of the formula

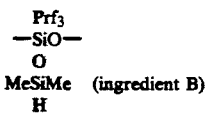

where Prf₃ represents 3,3,3-trifluoropropyl;

2.22 parts of a dimethylhydrogensiloxy terminated poly(methyl-3,3,3-trifluoropropyl)siloxane containing an average of 3 methyl-3,3,3-trifluoropropylsiloxane units per molecule.

0.1, 0.2 or 0.5 part of the catalyst-inhibiting polydiorganosiloxane described in the first section of this Example.

The resultant curable composition was optically clear. One portion of this curable composition was stored at 25° C. and tested at one hour intervals between the hours of 8 A.M. and about 4 P.M. by inserting a metal spatula into the composition and slowly withdrawing the spatula together with a portion of the composition adhering to the tip of the spatula. The time interval following which the composition first pulled away from the tip of the spatula in a manner similar to a released elongated rubber band was recorded as the "snap time".

A second portion of the composition was cured to a gel by heating for ½ hour at a temperature of 125° C., at which time the extent of cure was measured using a penetrometer (catalog no. 73,510, manufactured by Precision Scientific Company). The standard cones supplied with the instrument were replaced with a cylindrical brass head measuring 6.350 mm. in diameter, 4.762 mm. in height and having a flat bottom and rounded edges. The total weight of the shaft and head was 19.5 grams.

The "snap" time and penetration for each of the gel samples are recorded in the following Table I.

TABLE I

| Inhibitor (parts) | Snap Time (hours @ 25° C.) | Penetration (mm) (after ½ hour @ 150° C.) |
|---|---|---|
| 0.1 | 8 | 8 |
| 0.2 | 8–16* | 13 |
| 0.5 | 30–44** | 15 |

*There was an eight hour interval between successive evaluations. The actual snap time was somewhere within this interval.
**There was a fourteen hour interval between successive evaluations. The actual snap time was somewhere within this interval.

For purpose of comparison 6 parts of ingredient A were blended with 0.14 part of four prior art platinum catalyst inhibitors and the resulting mixtures rated for optical clarity on a scale of 1 (optically clear) to 5 (very cloudy).

| Inhibitor | Rating |
|---|---|
| (MeViSiO)₃ | 3 |
| (MeViSiO)₃ | 4 |
| 1-ethynyl-1-cyclohexanol | 5 |
| 2-methyl-3-butyn-2-ol | 2 |
| Inhibitor I of this example | 1 |

EXAMPLE 2

An catalyst-inhibiting polydiorganosiloxane of this invention was prepared using the procedure described in the preceding Example 1 with the following reactants.

528 parts of 2,4,6-trimethyl-2,4,6-tris(3,3,3-trifluoropropyl)cyclotrisiloxane;

83 parts of 2,4,6-trimethyl-2,4,6-trivinylcyclotrisiloxane;

27 parts of a dimethylvinylsiloxy terminated polydimethylsiloxane containing an average of 6 dimethylsiloxy units per molecule;

0.95 part of trifluoromethanesulfonic acid; and 50.0 parts of sodium bicarbonate.

The resultant polydiorganosiloxane exhibited a viscosity of $5 \times 10^{-3}$ m²/sec. A curable composition was prepared by combining the resultant polydiorganosiloxane with ingredients A, B, and C identified in Example 1.

25 parts ingredient A 0.039 parts ingredient B.

Ingredient C and the catalyst-inhibiting polydiorganosiloxane in the amounts specified in the following Table II.

The compositions were stored at 25° C. for snap time determinations and cured for ½ hour at 125° C. for measurement of penetration values as described in Example 1. The data from these evaluations are recorded in Table II.

TABLE II

| Ingredient C (parts) | Inhibitor (parts) | Snap Time (hours) @ 25° C. | Penetration (¼ hr. @ 150° C.) |
| --- | --- | --- | --- |
| 1.06 | 0.0 | 0.33 | 6 |
| 1.06 | 0.1 | 5.5 | 6 |
| 1.07 | 0.2 | 6–23* | 6 |
| 1.11 | 0.5 | 30 | 6 |

*There was a seventeen hour time interval between successive evaluations. The actual snap time was within this interval.

These data demonstrate the ability of the present method to substantially increase the working time of a polyorganosiloxane composition at 25° C. without substantially decreasing the cure rate of the composition at conventional curing temperatures.

EXAMPLE 3

This Example describes a curable composition wherein a catalyst-inhibiting polydiorganosiloxane of this invention constitutes all of the vinyl-containing polyorganosiloxane (ingredient A) present in a curable composition.

PREPARATION OF INGREDIENT A

A glass reactor equipped with a mechanically operated stirrer, reflux condenser and heating means was charged with the following reactants.
100 parts of 2,4,6-trimethyl-2,4,6-tris(3,3,3-trifluoropropyl)cyclotrisiloxane;
46.3 parts of octamethylcyclotetrasiloxane;
8.6 parts of 2,4,6,8-tetramethyl-2,4,6,8-tetravinylcyclotetrasiloxane; and
2.3 parts of sym-tetramethyldivinyldisiloxane.

The resultant mixture was stirred at room temperature for a few moments to make it homogeneous, at which time 0.15 part of trifluoromethanesulfonic acid was added. The reaction mixture was then heated at a temperature of 55° C. for about three hours, at which time the reaction mixture exhibited a viscosity of $4 \times 10^{-4}$ m$^2$/sec. The reaction mixture was then cooled to room temperature and neutralized by the addition of 20 parts of sodium bicarbonate. After stirring for about 16 hours at room temperature the liquid phase of the reaction mixture was isolated by filtration and concentrated by heating it for one hour at a temperature of 200° C. under a pressure of 40 milipascals. The concentrated liquid, which consisted essentially of polymer A, an inhibitor of this invention, was obtained in 85% yield, exhibited a viscosity of $1.1 \times 10^{-3}$ m$^2$/sec., and contained 1.24 weight percent of vinyl radicals, equivalent to 8 mole percent of vinyl-containing siloxane units.

For comparison purposes a second polymer, referred to hereinafter as polymer X, was prepared using the same types and amounts of reactants and procedure as ingredient A, with the exception of the catalyst and sodium bicarbonate. The trifluoromethanesulfonic acid was replaced with 0.6 parts of potassium silanolate, and the sodium bicarbonate with a sufficient amount of solid carbon dioxide ("dry" ice) to neutralize the reaction mixture.

Unlike trifluoromethanesulfonic acid, silanlolate catalysts are known to cause rearrangement of silicon-to-oxygen bonds. It was therefore expected that many of the sequences of four methylvinylsiloxy units present in the cyclic siloxane reactant would not appear in the final product. By comparison, it was expected that polymer A would contain substantially all of the sequences of four methylvinylsiloxy units present in the corresponding cyclic tetrasiloxane reactant.

Polymer X was obtained in 45 percent yield, exhibited a viscosity of $1.4 \times 10^{-3}$ m$^2$/sec. and contained 1.16 percent of vinyl radicals.

Curable compositions were prepared by combining 25 parts of either polymer A or polymer X with either 6.6 parts (molar ratio SiH/vinyl=1.7) or 4.95 parts (molar ratio SiH/vinyl=1.3) of a dimethylhydrogensiloxy terminated poly(methyl-3,3,3-trifluoropropyl)siloxane containing an average of three methyl-3,3,3-trifluoropropylsiloxane units per molecule and 0.02 part of the platinum hydrosilation catalyst described in the preceding Example 1. Samples of each of the four compositions were stored at 25°, 50° and 115° C. and tested for "snap" at one hour intervals between the hours of 8 A.M. and 4 P.M. as described in the preceding Example 1. The results of this evaluation are recorded in the following Table III together with the molar ratio of silicon bonded hydrogen atoms to vinyl radicals in each of the curable compositions.

TABLE III

| Polymer | A | A | X | X |
| --- | --- | --- | --- | --- |
| SiH/Vinyl Ratio | 1.7 | 1.3 | 1.7 | 1.3 |
| Snap Time (25° C.) | 96 Hr. | 96 Hr. | 4–18 Hr.* | 4–18 Hr.* |
| Snap Time (50° C.) | 3–18 Hr.* | 3–18 Hr.* | 1 Hr. | 1¼ Hr. |
| Snap Time (115° C.) | 9 Min. | 8 Min. | 4 Min. | 5 Min. |

*There was a 14 or 15 hour interval between two successive measurements. The actual snap time occurred somewhere during this interval.

All of the cured compositions were optically clear elastomers.

The data in this table demonstrate the ability of the present catalyst-inhibiting polydiorganosiloxanes to increase the working time of a curable composition at temperatures of 25° and 50° C. when used as the entire portion of the vinyl-containing polydiorganosiloxane reactant.

That which is claimed is:
1. In a method for extending the working life at 25 degrees C. of a curable organosiloxane composition comprising
   A. at least one triorganosiloxy terminated polydiorganosiloxane containing at least two vinyl radicals per molecule,
   B. an amount sufficient to cure said composition of a organohydrogensiloxane containing at least two silicon bonded hydrogen atoms per molecule,
   C. a platinum hydrosilation catalyst in an amount sufficient to promote curing of said composition at a temperature of at least 100 degrees C., and
   D. an amount of inhibitor for said catalyst sufficient to extend the working time of said composition at room temperature, where said inhibitor is a vinyl-containing polydiorganosiloxane that constitutes at least a portion of said triorganosiloxy-terminated polydiorganosiloxane, the improvement comprising selecting as the inhibitor portion of said triorganosiloxy terminated polyorganosiloxane at least one polydiorganosiloxane containing in each molecule at least one sequence of at least two organovinylsiloxane units and represented by the average formula

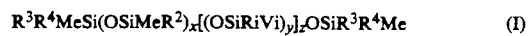

$$R^3R^4MeSi(OSiMeR^2)_x[(OSiR^iVi)_y]_zOSiR^3R^4Me \quad (I)$$

where Me represents methyl, Vi represents vinyl, $R^1$, $R^2$ and $R^3$ individually represent methyl, phenyl or —CH$_2$CH$_2$Rf, $R^4$ is selected from the group consisting of $R^1$ and vinyl radicals, Rf represents a perfluoroalkyl radical containing from 1 to 8 carbon atoms, the value of x is at least 4, the value of y is from 2 to 5, and the value of z is at least 1, and where said catalyst-inhibiting portion of the triorganosiloxy-terminated polydiorganosiloxane is prepared by polymerizing in the presence of an acid catalyst a first cyclic diorganosiloxane containing repeating units of the formula ViR$^1$SiO, a second cyclic diorganosiloxane containing repeating units of the formula MeR$^2$SiO and an organosilicon compound comprising at least one unit of the formula R$^3$R$^4$MeSiX or R$^3$R$^4$MeSiO$_{\frac{1}{2}}$, where X represents a hydrolyzable atom or group.

2. A method according to claim 1 where R1, R3 and R4 are methyl, R2 is methyl or 3,3,3-trifluoropropyl, said composition includes at least one polydiorganosiloxane containing vinyl radicals only on the terminal silicon atoms and said acid catalyst is sulfuric acid or an alkanesulfonic acid.

3. A method according to claim 2 where said polydiorganosiloxane containing vinyl radicals only on the terminal silicon atoms is a poly(methyl-3,3,3-trifluoropropylsiloxane) and said acid catalyst is trifluoromethanesulfonic acid.

4. A method according to claim 2 where said platinum hydrosilation catalyst is a complex of hexachloroplatinic acid with a low molecular weight organosiloxanes comprising vinyl and methyl radicals as the organic groups bonded to silicon.

5. A method according to claim 1 where $R^1$, $R^3$ and $R^4$ are methyl, $R^2$ is methyl or 3,3,3-trifluoropropyl and said inhibitor constitutes all of said triorganosiloxy terminated polydiorganosiloxane present in said composition.

6. A method according to claim 4 where the organic of said vinyl-containing organosiloxanes also include 3,3,3-trifluoropropyl radicals.

* * * * *